United States Patent
Luo et al.

(10) Patent No.: US 10,841,076 B2
(45) Date of Patent: *Nov. 17, 2020

(54) WIRELESS DEVICES AND SYSTEMS INCLUDING EXAMPLES OF CROSS CORRELATING WIRELESS TRANSMISSIONS

(71) Applicant: MICRON TECHNOLOGY, INC., Boise, ID (US)

(72) Inventors: Fa-Long Luo, San Jose, CA (US); Tamara Schmitz, Scotts Valley, CA (US); Jeremy Chritz, Seattle, WA (US); Jaime Cummins, Bainbridge Island, WA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,518

(22) Filed: May 30, 2019

(65) Prior Publication Data
US 2019/0280851 A1 Sep. 12, 2019

Related U.S. Application Data

(63) Continuation of application No. 15/374,831, filed on Dec. 9, 2016, now Pat. No. 10,333,693.

(51) Int. Cl.
*H04L 7/04* (2006.01)
*H04L 27/00* (2006.01)
*H04L 27/26* (2006.01)

(52) U.S. Cl.
CPC .......... *H04L 7/042* (2013.01); *H04L 27/0006* (2013.01); *H04L 27/2647* (2013.01); *H04L 27/2663* (2013.01); *H04L 27/2678* (2013.01)

(58) Field of Classification Search
CPC . H04L 7/042; H04L 27/0006; H04L 27/2647; H04L 27/2663; H04L 27/2678
See application file for complete search history.

(56) References Cited

U.S. PATENT DOCUMENTS

| 10,333,693 B2 * | 6/2019 | Luo ................. H04L 7/042 |
| 2005/0220175 A1 | 10/2005 | Zhou |

(Continued)

FOREIGN PATENT DOCUMENTS

WO 2018106297 A1 6/2018

OTHER PUBLICATIONS

International Search Report and Written Opinion received for PCT Application No. PCT/US2017/048736, dated Nov. 23, 2017.

(Continued)

*Primary Examiner* — David B Lugo
(74) *Attorney, Agent, or Firm* — Dorsey & Whitney LLP

(57) ABSTRACT

Examples described herein include systems and methods which include wireless devices and systems with examples of cross correlation including symbols indicative of radio frequency (RF) energy. An electronic device including a statistic calculator may be configured to calculate a statistic including the cross-correlation of the symbols. The electronic device may include a comparator configured to provide a signal indicative of a presence or absence of a wireless communication signal in the particular portion of the wireless spectrum based on a comparison of the statistic with a threshold. A decoder/precoder may be configured to receive the signal indicative of the presence or absence of the wireless communication signal and to decode the symbols responsive to a signal indicative of the presence of the wireless communication signal. Examples of systems and (Continued)

methods described herein may facilitate the processing of data for wireless communications in a power-efficient and time-efficient manner.

20 Claims, 4 Drawing Sheets

(56) References Cited

U.S. PATENT DOCUMENTS

| | | |
|---|---|---|
| 2006/0203925 A1 | 9/2006 | Pirooz et al. |
| 2006/0220901 A1 | 10/2006 | Ginggen et al. |
| 2008/0212696 A1 | 9/2008 | Takahashi et al. |
| 2009/0147893 A1 | 6/2009 | Takahashi et al. |
| 2010/0091911 A1 | 4/2010 | Sawai et al. |
| 2012/0250740 A1 | 10/2012 | Ling |
| 2015/0208253 A1 | 7/2015 | Kim et al. |
| 2016/0007288 A1 | 1/2016 | Samardzija et al. |
| 2016/0173241 A1 | 6/2016 | Goodson et al. |
| 2016/0219506 A1 | 7/2016 | Pratt et al. |
| 2016/0353398 A1 | 12/2016 | De Ruijter et al. |
| 2017/0164289 A1 | 6/2017 | Mofidi et al. |
| 2017/0257774 A1 | 9/2017 | Ghosh et al. |
| 2017/0310436 A1 | 10/2017 | Nuzman et al. |
| 2018/0167194 A1 | 6/2018 | Luo et al. |

OTHER PUBLICATIONS

U.S. Appl. No. 15/374,831 entitled "Wireless Devices and Systems Including Examples of Cross Correlating Wireless Transmissions", filed Dec. 9, 2016, pp. all.

Alink, et al., Exploring the Use of Two Antennas for Crosscorrelation Spectrum Sensing, 2011 IEEE Vehicular Technology Conference (VTS Fall), Dec. 2011, p. 1-5, Dec. 1, 2011.

EESR dated Aug. 3, 2020 for EP Application No. 17878075.5, 9 pgs.

* cited by examiner

WIRELESS DEVICES AND SYSTEMS INCLUDING EXAMPLES OF CROSS CORRELATING WIRELESS TRANSMISSIONS

CROSS REFERENCE TO RELATED APPLICATION(S)

This application is a continuation of U.S. patent application Ser. No. 15/374,831 filed Dec. 9, 2016 and issued as U.S. Pat. No. 10,333,693 on Jun. 25, 2019. The aforementioned application, and issued patent, is incorporated herein by reference, in its entirety, for any purpose.

BACKGROUND

There is interest in moving wireless communications to "fifth generation" (5G) systems. 5G promises increased speed and ubiquity, but methodologies for processing 5G wireless communications have not yet been set. Implementing 5G systems may require more efficient use of the wireless spectra.

Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

DETAILED DESCRIPTION

Figure 1:
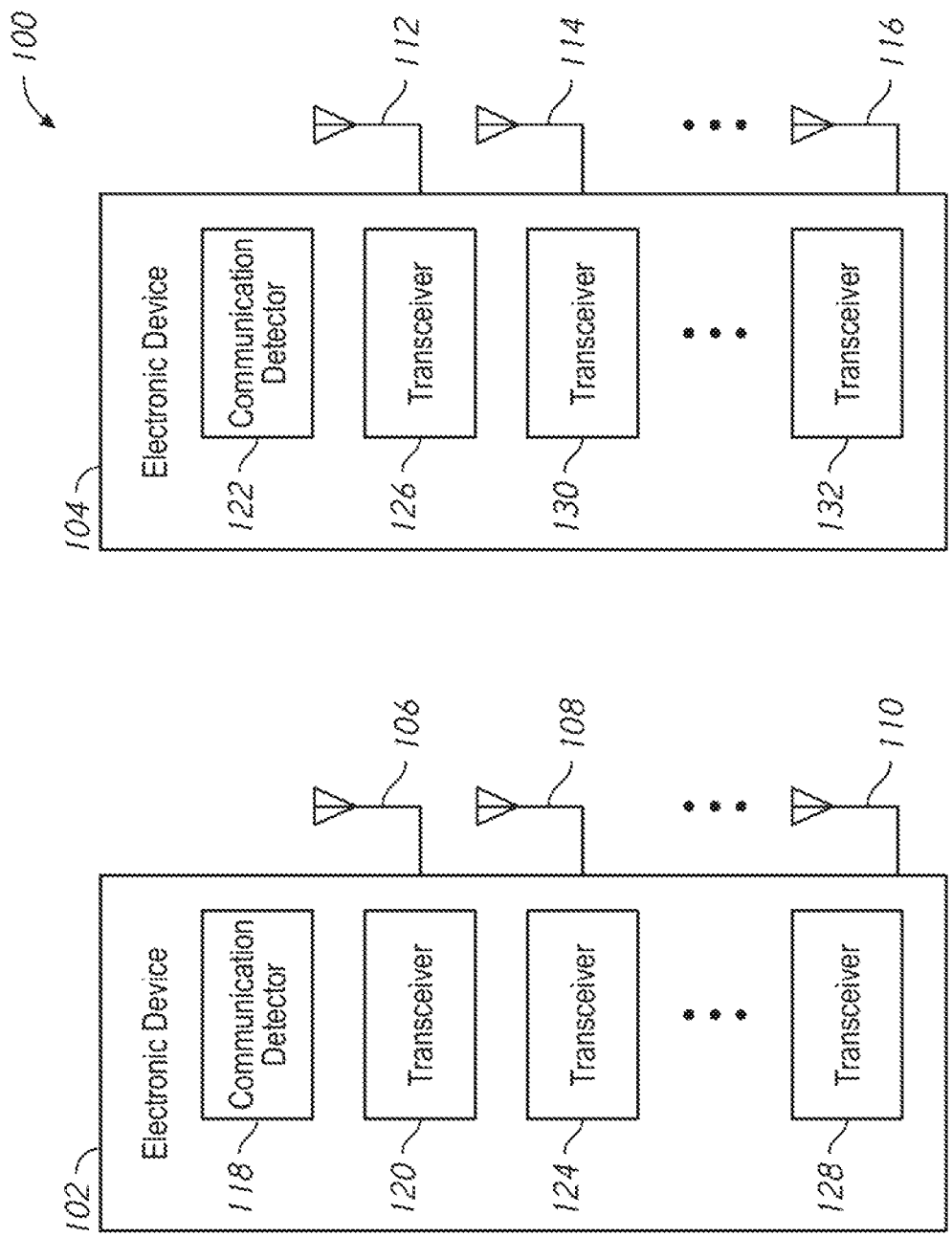
FIG. 1 is a schematic illustration of a system arranged in accordance with examples described herein.

Certain details are set forth below to provide a sufficient understanding of embodiments of the invention. However, it will be clear to one skilled in the art that embodiments of the invention may be practiced without various of these particular details. In some instances, well-known wireless communication components, circuits, control signals, timing protocols, computing system components, and software operations have not been shown in detail in order to avoid unnecessarily obscuring the described embodiments of the invention.

By using information from massive multi-inputs and multi-outputs (MIMO) systems described herein (which may be utilized in 5G wireless systems), examples described herein detect unused frequency bands (e.g. frequency bands which are idle and/or available for use). The unused frequency bands may have been licensed to other communications and broadcasting systems in some examples. Examples described herein may utilize an autocorrelation between different MIMO transmission channels in combination with a cross-correlation between those MIMO transmission channels (or different transmission channels) to determine whether a particular frequency or frequency band is idle and/or available for use.

5G systems may advantageously make improved usage of frequency spectrum resources. Frequency bands in some systems may be assigned by regulatory authorities such as the Federal Communication Commission (FCC). Assignments may be made, for example, according to different applications such as digital broadcasting and wireless communication. These licensed and assigned frequencies may be idled and wasted if there is neither service nor transmission, which may often be the case in many applications. Such idling may not be acceptable when improved efficiency is demanded from the wireless spectrum. Moreover, with the fast development of digital transmission and communications, there are fewer and fewer unlicensed frequency bands and it may be advantageous to re-use those licensed frequency bands if they are idle. For example, the FCC has officially proposed to open some UHF bands for unlicensed uses and is also considering how to use the frequency bands which are over 6 GHz (e.g. millimeter wave bands). Examples described herein may be utilized to detect unused bands (e.g. frequency bands which are idle and/or available for use). Without a good detection scheme, transmissions made in the band may be subject to strong interference by other transmissions occurring in the same band.

In some examples, it may be advantageous to provide an electronic device that may only decode wireless communications when signals are detected at the transceiver. Such an approach may conserve power consumed by the electronic device, for example, for decoding of wireless communications. In some examples, the detector and/or decoder portion of the electronic device may be powered off until an indication is provided to that detector and/or decoder that a signal is present in a particular portion of the wireless spectrum. The indication may indicate that received signals at the multiple antennas of the electronic device include a target signal (e.g. a 5G wireless communication signal). Utilizing such an approach, the detector and/or decoder portion of the electronic device may not process noise signals that may be received at the antennas. In contrast, a conventional MIMO transceiver may process and decode such noise signals, only being realized as noise once the detector and/or decoder portion of the MIMO transceiver has processed the received signals.

Examples described herein include systems and methods which include wireless devices and systems with communication detectors which may utilize a cross-correlation between multiple wireless channels to generate a statistic. Such a statistic may be compared to a threshold to determine whether a communication signal is present or if the portion of the spectrum is idle and/or available for use. In some examples, a communication detector may be included in an electronic device that includes multiple antennas. Radio frequency (RF) energy may be incident on multiple antennas (e.g. a first and second antenna). The communication detector may perform a cross-correlation between symbols indicative of the RF energy received on the first and second antennas in a portion of the wireless spectrum (e.g. at a particular frequency and/or frequency band) and compare the cross-correlation to a threshold to determine whether a wireless communication is present in that portion of the wireless spectrum. The RF energy received on the first and second antenna in a portion of the wireless spectrum may be referred to as RF signals from each antenna. The communication detector may provide a signal indicative of either (1) a wireless communication signal being present in the portion of the wireless spectrum (e.g. a '1'); or (2) the portion of the wireless spectrum being idle and/or available for use (e.g. a '0'). Receivers, transmitters, and/or transceivers described herein may receive the incident RF energy response to the indication that the wireless communication is present in the portion of the wireless spectrum, and generate symbols that are cross correlated the communication detector. A decoder/precoder of the electronic device described herein may receive a signal indication from the communication detector and may transmit and/or encode in the portion of the wireless spectrum indicated as being idle and/or available for use. Generally, a portion of the wireless spectrum may be considered idle and/or available for use herein when the statistic calculated by a communication detector using a cross-correlation between wireless channels is below a threshold. The threshold may be set, for example, such that when the cross-correlation between wireless channels is below the threshold, a communication may be sent on the channel(s) with an acceptable amount of interference.

FIG. 1 is a schematic illustration of a system arranged in accordance with examples described herein. System 100 includes electronic device 102, electronic device 104, antenna 106, antenna 108, antenna 110, antenna 112, antenna 114, antenna 116, communication detector 118, transceiver 120, transceiver 124, transceiver 128, communication detector 122, transceiver 124, transceiver 126, transceiver 130, transceiver 132. The electronic device 102 may include antenna 106, antenna 108, and antenna 110. The electronic device 102 may include communication detector 118, transceiver 120, transceiver 124, and transceiver 128. Communication detector 118 and transceivers 120, 124, 128 may be in communication with one another. Each transceiver 120, 124, 128 may in communication with a respective antenna, such as antenna 106, antenna 108, and antenna 110. The electronic device 104 may include antenna 112, antenna 114, and antenna 116. The electronic device 104 may include communication detector 122 and transceivers 124, 126, 132. Communication detector 122 and transceivers 124, 126, 132 may be in communication with one another. Each transceiver 124, 126, 132 may be in communication with a respective antenna, such as antenna 112, antenna 114, and antenna 116. In other examples, fewer, additional, and/or different components may be provided.

Electronic devices described herein, such as electronic device 102 and electronic device 104 shown in FIG. 1 may be implemented using generally any electronic device for which communication capability is desired. For example, electronic device 102 and/or electronic device 104 may be implemented using a mobile phone, smartwatch, computer (e.g. server, laptop, tablet, desktop), or radio. In some examples, the electronic device 102 and/or electronic device 104 may be incorporated into and/or in communication with other apparatuses for which communication capability is desired, such as but not limited to, an automobile, airplane, helicopter, appliance, tag, camera, or other device.

While not explicitly shown in FIG. 1, electronic device 102 and/or electronic device 104 may include any of a variety of components in some examples, including, but not limited to, memory, input/output devices, circuitry, processing units (e.g. processing elements and/or processors), or combinations thereof.

The electronic device 102 and the electronic device 104 may each include multiple antennas. For example, the electronic device 102 and electronic device 104 may each have more than two antennas. Three antennas each are shown in FIG. 1, but generally any number of antennas may be used including 2, 3, 4, 5, 6, 7, 8, 9, 10, 11, 12, 13, 14, 15, 16, 32, 64, or 96 antennas. Other numbers of antennas may be used in other examples. In some examples, the electronic device 102 and electronic device 104 may have a same number of antennas, as shown in FIG. 1. In other examples, the electronic device 102 and electronic device 104 may have different numbers of antennas. Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 96) antennas to transmit and/or receive transmissions. As the number of antennas increase, so to generally does the complexity involved in accurately transmitting and/or receiving transmissions.

Although two electronic devices (e.g. electronic device 102 and electronic device 104) are shown in FIG. 1, generally the system 100 may include any number of electronic devices.

Electronic devices described herein may include receivers, transmitters, and/or transceivers. For example, the electronic device 102 of FIG. 1 includes transceiver 120 and the electronic device 104 includes transceiver 124. Generally, receivers may be provided for receiving transmissions from one or more connected antennas, transmitters may be provided for transmitting transmissions from one or more connected antennas, and transceivers may be provided for receiving and transmitting transmissions from one or more connected antennas. The transmissions may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards. Generally, multiple receivers, transmitters, and/or transceivers may be provided in an electronic device—one in communication with each of the antennas of the electronic device. For example, the transceiver 124 may be used to provide transmissions to and/or receive transmissions from antenna 112, while other transceivers may be provided to provide transmissions to and/or receive transmissions from antenna 114 and antenna 116.

Communication detectors described herein, may provide an indication to multiple transceivers. So, for example, the electronic device 104 may include three transceivers, including the transceiver 124, to service antenna 112, antenna 114, and antenna 116, respectively. The communication detector 122 may be in communication with multiple (e.g. all) of the transceivers of the electronic device 104, and may provide an indication of the presence or absence of a wireless communication signal in a portion of the wireless spectrum to the multiple (e.g. all) transceivers, including those coupled to the antenna 112, antenna 114, and antenna 116.

Examples of transmitters, receivers, and/or transceivers described herein, such as the transceiver 120 and transceiver 124 may be implemented using a variety of components, including, hardware, software, firmware, or combinations thereof. For example, transceivers may include circuitry and/or one or more processing units (e.g. processors) and memory encoded with executable instructions for causing the transceiver to perform one or more functions described herein (e.g. software).

It may be desirable in some examples to make more efficient use of wireless spectra. For example, it may be desirable for one or more electronic devices described herein to determine that a particular portion of wireless spectra (e.g. one or more frequencies or frequency bands) currently contains a communication signal and/or is currently idle and/or available for use in providing and/or receiving a transmission. Particularly as wireless communications move toward 5G standards, efficient use of wireless spectra may become increasingly important.

Accordingly, electronic devices described herein may include one or more communication detectors. For example, the electronic device 102 may include communication detector 118 and the electronic device 104 may include communication detector 122. Examples of communication detectors described herein may utilize properties of the MIMO system to determine whether a particular portion of the wireless spectrum (e.g. one or more frequencies or frequency bands) are in use. Communication detectors described herein may provide an indication to receiver(s), transmitter(s), and/or transceiver(s) that a particular portion of the wireless spectrum is idle and/or available for use. Responsive to such an indication, a transmitter and/or transceiver may transmit and/or encode transmissions on or for the particular portion of the wireless spectrum. Alternatively or additionally, an indication may be provided that a wireless communication signal is present on a particular portion of the wireless spectrum. In some examples, the indication may be representative of encoded data in the wireless communication signal. Responsive to such an indication, a receiver and/or transceiver may receive and/or decode transmissions received on the particular portion of the wireless spectrum.

For example, the communication detector 122 may provide an indication to the transceiver 124 that a particular portion of the wireless spectrum available at the antenna 112, antenna 114, and/or antenna 116 is idle and/or available for use. Responsive to the indication, the transceiver 126 may prepare to encode and/or transmit transmissions using that particular portion of the wireless spectrum (e.g. on the particular portion of the wireless spectrum) for transmission via antenna 112.

In some examples, the communication detector 122 may provide an indication to the transceivers 126, 130, 132 that a particular portion of the wireless spectrum available at the antenna 112, antenna 114, and/or antenna 116 contains a communication signal. Responsive to the indication that a signal is included in the transmission, a decoder/precoder of the electronic device (e.g., decoder/precoder 320) may prepare to receive and/or decode transmissions using that particular portion of the wireless spectrum (e.g. on the particular portion of the wireless spectrum).

Examples of communication detectors described herein, including the communication detector 118 and/or communication detector 122 of FIG. 1 may be implemented using hardware, software, firmware, or combinations thereof. For example, the communication detector 118 and/or communication detector 122 may be implemented using circuitry and/or one or more processing unit(s) (e.g. processors) and memory encoded with executable instructions for causing the communication detector to perform one or more functions described herein.

Figure 2:
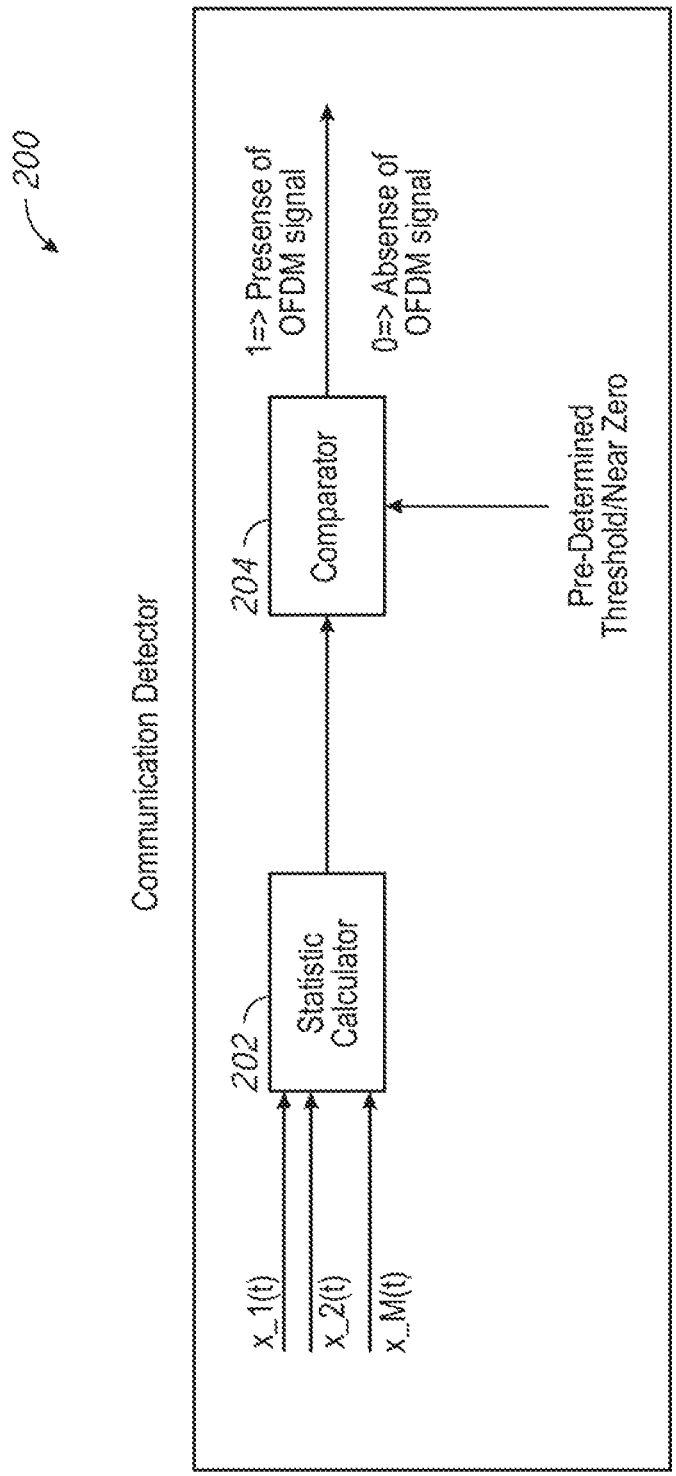
FIG. 2 is a schematic illustration of an example communication detector arranged in accordance with examples described herein.

Examples of communication detectors described herein may advantageously utilize properties of the MIMO system in which they are located to detect whether a particular portion of the wireless spectrum is idle and/or available for use. For example, communication detectors described herein may utilize a cross-correlation between multiple channels to determine whether a particular portion of the wireless spectrum contains a wireless communication signal and/or is idle and/or available for use. In some example, communication detectors may utilize both a cross-correlation between multiple channels and an auto-correlation between the multiple channels (or different channels) to determine whether a particular portion of the wireless spectrum contains a communications signal and/or is idle and/or available for use. FIG. 2 is a schematic illustration of an example communication detector arranged in accordance with examples described herein. The communication detector 200 includes statistic calculator 202 and comparator 204. Received symbols may be provided to the statistic calculator 202. The statistic calculator 202 may calculate a statistic that may be provided to comparator 204 for comparison with a threshold which may, e.g. retrieved from a memory and/or hard-coded into the comparator 204. The comparator 204 may compare the statistic with a threshold and output an indication of whether a wireless communication is present in the portion of the wireless spectrum and/or whether the portion of the wireless spectrum is idle and/or available for use. For example, a '1' may be provided if the portion of the wireless spectrum includes a wireless communication signal. A '0' may be provided if the portion of the wireless spectrum is idle and/or available for use. In other examples, a '1' may be provided if the portion of the wireless spectrum is idle and/or available for use, while a '0' may be provided if the portion of the wireless spectrum includes a wireless communication signal.

The communication detector 200 may be used to implement and/or be implemented by any of the communication detectors described herein, such as the communication detector 118 and/or the communication detector 122 of FIG. 1.

Examples of statistic calculators described herein, such as statistic calculator 202 may receive information from two or more antennas (e.g. from a number of communication channels). Any number of antennas (and corresponding inputs to the statistic calculator 202) may be used. The statistic calculator 202 is shown in FIG. 2 as receiving "M" inputs, labeled $x\_1(t)$, $x\_2(t)$ . . . $x\_M(t)$. Accordingly, time-domain symbols may be provided to the statistic calculator 202. Referring back to FIG. 1, for example, the communication detector 118 may receive symbols indicative of RF energy in a portion of the wireless spectrum incident on antenna 106, antenna 108, and/or antenna 110. A corresponding one of the transceivers 120, 124, 128 may process the symbols indicative of RF energy in a portion of the wireless spectrum to generate time-domain symbols indicative of 5G data. The communication detector 122 may receive the symbols processed by the transceivers for detection of an 5G signal.

Any portion of the wireless spectrum may be used. For example, the antennas may be tuned to a particular frequency and/or frequency band, and consequently the data provided by those antennas may relate to that particular frequency and/or frequency band. Examples of frequency bands include those licensed by the FCC, and generally may include any RF frequencies. Generally, RF frequencies may range from 3 Hz to 3000 GHz in some examples. In some examples, a particular band may be of interest. Examples of bands include all or portions of a very high frequency (VHF) band (e.g. 30-300 Mhz), all or portions of an ultra high frequency (UHF) band (e.g. 300-3000 MHz), and/or all or portions of a super high frequency (SHF) band (e.g. 3-30 GHz). Example bands may include 5G wireless frequency ranges, such as utilizing a carrier frequency in the E band (e.g., 71 76 GHz and 81-86 GHz), a 28 GHz Millimeter Wave (mmWave) band, or a 60 GHz V band (e.g., implementing a 802.11 ad protocol).

Example statistic calculators may calculate statistics based on RF energy from a portion of a wireless spectrum of generally any width (e.g. 5, 10, 15, 20, 25, 30, 35, 40, 45, 50 or more MHz widths). If no signal is found in the portion of the wireless spectrum by communication detectors described herein, then transceivers described herein may transmit a signal in that portion of the wireless spectrum. If a signal is found in the portion of the wireless spectrum by communication detectors, that portion may not be used for transmission and/or decoders/precoders described herein may be activated to receive and/or decode the signal.

Example statistic calculators, such as the statistic calculator 202 may be implemented in hardware, software, firmware, or combinations thereof. For example, statistic calculator 202 may be implemented wholly or partially in circuitry, and/or by one or more processing units (e.g. processors) and memory encoded with executable instructions for statistic calculation, which, when executed by the one or more processing units, cause the statistic calculator to calculate statistics described herein.

The statistic calculator may calculate a cross-correlation between RF energy received on multiple channels, an auto-correlation between RF energy received on multiple channels, or combinations thereof. The statistic calculator 202 may provide a statistic to the comparator 204.

Examples of statistics provided by statistic calculators described herein may include a cross-correlation of symbols indicative of RF energy incident on multiple antennas in a particular portion of the wireless spectrum. The cross-correlation may be indicative of the presence of a wireless communication signal. For example, consider a case H0 where only noise is incident on two antennas, and a case H1 where a wireless communication signal that includes a signal with encoded data, is incident on two antennas. Mathematically, the null and alternate hypothesis can be represented as:

$$\begin{cases} H0: x_1(t) = n_1(t), x_2(t) = n_2(t) \\ H1: x_1(t) = n_1(t) + w_1(t)s(t), x_2(t) = n_2(t) + w_2(t)s(t) \end{cases} \quad (1)$$

where $x_1$ is the received time-domain signal corresponding to a noise signal $n_1$ incident on the first antenna, and $x_2$ is the received time-domain signal corresponding to a noise signal $n_2$ incident on the second antenna (e.g. the first antenna may correspond to antenna 106 of FIG. 1 and the second antenna may correspond to antennal 108 of FIG. 1). A wireless communication signal is represented in case H1 by s(t). $w_1$ and $w_2$ represent weights applied to the wireless communication signal by the respective transceivers coupled to antennas 1 and 2, respectively. It can be expected that the portion of the wireless communication signal received at each of the antennas—antenna 1 and antenna 2 may be highly correlated (e.g., in a cross correlation operation). However, the noise signals received at each antenna may be significantly less correlated. Mathematically, the cross-correlations of the symbols indicative of received RF energy in each case—case H0 and case H1 can be expressed as:

$$\begin{cases} H0: R_{12}(t, 0) = E[x_1(t)x_2^*(t)] = E[n_1(t)n_2^*(t)] = 0 \\ H1: R_{12}(t, 0) = E[x_1(t)x_2^*(t)] = w_1(t)w_2(t)E[s(t)s^*(t)] \end{cases} \quad (2)$$

where $R_{12}$ is the cross-correlation of symbols indicative of RF energy received at antenna 1 with the RF energy received at antenna 2. E[ ] represents the expected value of the expression in the brackets, and the asterisk indicates the transpose of the noted function. Note that in the H0 case, the cross-correlation is expected to have a zero (or near zero) value. In the H1 case (e.g. where a wireless communication signal that includes is present), the cross-correlation is expected to have a significant amplitude (e.g. non-zero). Accordingly, the cross-correlation may provide a statistic for use in determining whether a wireless communication signal is present. Comparing a magnitude of the cross-correlation to a near-zero threshold value may allow for a determination of whether a wireless signal is present in the portion of the wireless spectrum received.

In examples utilizing 5G wireless communication signals, the statistic including a cross-correlation may be calculated by the statistic calculator 202 mathematically as follows:

$$R(t, 0) = \frac{1}{U}\sum_{z=0}^{U} x_1(t-z)x_2^*(t-z) \quad (3)$$

Where U may be the duration of a time period used to receive RF energy at an antenna.

Accordingly, the statistic calculator 202 may multiply energy received at each of a plurality of times at the first antenna (represented as x (t−z) where t is the current time and z varies from 0 to the total duration U) with the transpose of the same received at the second antenna. Those products may be summed over time units between 0 and the total time duration U, which may be a 5G symbol duration. The sum may be normalized by dividing by U in some examples.

In some examples, the statistic calculator 202 may utilize a recursive algorithm to calculate a cross-correlation over multiple symbols, such as 5G symbols. Such a recursive algorithm may be represented mathematically as:

$$R(t+1, 0) = \frac{1}{U+1}R(t, 0) + \frac{U}{U+1}x_1(t+1)x_2^*(t+1) \quad (4)$$

So, for example, the statistic calculator may calculate a cross-correlation at a next time (e.g. t+1) by multiplying symbols generated from the received RF energy at the first antenna at that time with the transpose of the symbols generated from the received RF energy at the second antenna at that time. That product may be multiplied by a constant relating to the symbol duration (e.g. U/U+1). That overall product may be added to the cross-correlation at the previous time multiplied by a constant relating to the symbol duration (e.g. 1/U+1).

More generally, in some examples, the recursive algorithm may also be represented as:

$$R(t+1,0)=\alpha R(t,0)+\beta x_1(t+1)x_2^*(t+1) \quad (5)$$

where $0 \leq \alpha, \beta \leq 1$ and $\alpha+\beta=1$.

In some examples, 5G wireless communication signals may include a guard interval of length V (e.g., a cyclic prefix of the OFDM target signal). The guard interval of a 5G signal may be included N time periods from the start of the 5G signal, beginning at specific N time point in the 5G signal. The guard interval may include a cyclic prefix that repeats a portion of the signal at the N time point. For example, the beginning of the 5G signal may be repeated in the cyclic prefix. As such, a signal that begins at time "z" and includes a cyclic prefix at time "N" may have the same data repeated at both time periods. When cross correlated, the beginning of the 5G signal and the guard interval including the cyclic prefix may be correlated. Accordingly, cross-correlations of the symbols received at the beginning of an RF signal and symbols received at a guard interval time periods may be computed in accordance with:

$$R(t, 0) = \frac{1}{U}\sum_{z=0}^{U} x_1(t-z)x_2^*(t-z) + \qquad (6)$$
$$\frac{1}{V}\sum_{z=0}^{V} x_1(t-z)x_2^*(t-N-z) + \frac{1}{V}\sum_{z=0}^{V} x_2(t-z)x_1^*(t-N-z)$$

In such a case, the recursive algorithm may be represented, in Equation 7, as:

$$R(t+1, 0) = \frac{1}{U+1}R(t, 0) + \frac{U}{U+1}x_1(t+1)x_2^*(t+1) + $$
$$\frac{1}{V}x_1(t-z)x_2^*(t-N-z) + \frac{1}{V}x_1(t-z)x_2^*(t-N-z)$$

Such a recursive algorithm may also be represented, in Equation 8, as:

$$R(t+1,0)=\alpha R(t,0)+\beta x_1(t+1)x_2^*(t+1)+1/\nu x_1(t-z)x_2^*(t-N-z)+1/\nu x_1(t-z)x_2^*(t-N-z)$$

where $0 \le \alpha, \beta \le 1$ and $\alpha+\beta=1$.

Accordingly, the statistic calculator may in some examples calculate a cross-correlation of symbols received at a guard interval incident on a first antenna with symbols received at a guard interval incident on a second antenna to provide a first cross correlation factor. The statistic calculator may further cross correlate a symbol duration U of the incident energy with a symbol duration U of the incident energy to generate a second cross correlation factor. The statistic calculator may combine, e.g. add, the two cross correlation factor to provide the statistic to the comparator. For example, to achieve the computation expressed in Equation 8, the statistic calculator may add the first cross correlation factor and the second cross correlation factor to generate the statistic provided to the comparator for comparison with a threshold.

While the example with respect to Equations 1-8 of statistic calculator have been described in the context of two antennas, it can be appreciated that cross correlation of multiple symbols indicative of RF energy incident on respective antennas can be used to calculate a statistic, for example, when wireless communication signals are received by M respective antennas receiving M respective wireless channels. For example, consider a case H0 where only noise is incident on M antennas, and a case H1 where a wireless communication signal that includes a signal with encoded data, is incident on M antennas. Mathematically, the null and alternate hypothesis can be represented as:

$$\begin{cases} H0: x_1(t) = n_1(t); x_2(t) = n_2(t); \ldots ; x_M(t) = n_M(t) \\ H1: x_1(t) = n_1(t) + w_1(t)s(t); x_2(t) = n_2(t) + w_2(t)s(t); \ldots ; x_M(t) = n_M(t) + w_M(t)s(t) \end{cases} \qquad (9)$$

H0 may represent the received data of each M wireless channel including respective noise signals. H1 may represent the received data of each M wireless channel including respective noise signals and the target signal, s(t). The weights $w_M(t)$ may represent respective weights applied to the target signal by the respective transceivers coupled to the respective M antennas. It can be expected that the portion of the wireless communication signal received at each of the antennas at each M antenna may be highly correlated (e.g., in a cross correlation operation). However, the noise signals received at each M antenna may be significantly less correlated. Mathematically, the cross-correlations of the symbols indicative of received RF energy in each case—case H0 and case H1 can be expressed as:

$$\begin{cases} H0: R_{ij}(t, 0) = E[x_i(t)x_j^*(t)] = E[n_i(t)n_j^*(t)] = 0 \\ H1: R_{ij}(t, 0) = E[x_{ij}(t)x_{ij}^*(t)] = w_i(t)w_j(t)E[s_1(t)s^*(t)] \end{cases} \qquad (10)$$

In Equation 15, i and j may be the index of each wireless channel (i, j, =1, 2, ... M) received at respective M antennas of the electronic device 102. As noted above, E[ ] represents the expected value of the expression in the brackets, and the asterisk indicates the transpose of the noted function. Note that in the H0 case, the cross-correlation is expected to have a zero (or near zero) value. In the H1 case (e.g. where a wireless communication signal that includes a signal with encoded data is present), the cross-correlation is expected to have a significant amplitude (e.g. non-zero). Accordingly, the cross-correlation may provide a statistic for use in determining whether a wireless communication signal is present. Comparing a magnitude of the cross-correlation to a near-zero threshold value may allow for a determination of whether a wireless signal is present in the portion of the wireless spectrum received. As can be appreciated by the disclosure herein, the inclusion of additional wireless channels (e.g., M wireless channels) may provide a more accurate or improved statistic, especially when wireless communication signals are averaged over time to calculate the statistic. For example, the multiple wireless channel involvement may improve an SNR ratio of the statistic.

While the above example of 5G wireless communications signals have been described in the context of two signals received from respective first and second antennas, it can be appreciate that M RF signals may be received at respective M antennas. In the example, the statistic including a cross-correlation of M RF signals may be calculated by the statistic calculator 202 mathematically as follows:

$$R(t, 0) = \frac{1}{U}\sum_{i=1}^{M}\sum_{j=i+1}^{M}\sum_{z=0}^{U} x_1(t-z)x_j^*(t-z) \qquad (11)$$

U may be the duration of a time period to receive RF energy at M antennas. Accordingly, the statistic calculator 202 may multiply the symbols indicative of RF energy received at each of a plurality of times at M antennas (represented as x(t−z) where t is the current time and z varies from 0 to the total duration U) with the transpose of the same received at the M antenna. According to Equation 11, each symbol indicative of RF energy received at M antenna may be multiple with each other symbol received at all the other M antennas. Those products may be summed over time units between 0 and the total time duration U, which may be a 5G symbol duration. The sum may be normalized by dividing by U in some examples. Over the duration of several 5G symbols, a recursive algorithm according to Equation 11 such that each 5G symbol is included to calculate the statistic.

While the above examples with respect to statistic calculator 202 have been described with respect to cross correlation, it can be appreciated that other statistics may be calculated by other possible implementations of statistic calculators. While not depicted in FIG. 2, an additional statistic calculator may be added to the communication detector 200 such that the additional statistic calculator calculates a statistic for an additional comparator before the statistic calculator 202 calculates a statistic for the comparator 204. Additional statistic calculators may include a signal power autocorrelation statistic calculator, a pilot signal statistic calculator that calculates the cross correlation of symbols indicative of a pilot signal received at a particular antenna, or a guard interval statistic calculator that calculates the symbols generated from guard intervals solely. For example, a pilot signal statistic calculator may receive symbols indicative of RF energy at antenna 106 and processed by the corresponding wireless transceiver 120 to generate symbols for a statistic calculation that compares the symbols to the symbols of a known pilot signal. Any such statistic calculators may be utilized as part of a communication detector 200 that includes multiple statistic calculators 202 and multiple comparators 204. From one perspective, an additional statistic calculator and corresponding additional comparators before the statistic calculator 202 may be viewed as "soft" detection or a rough classification. The communication detector 200 may receive an additional signal indicative of either (1) a wireless communication signal being present in the portion of the wireless spectrum (e.g. a '1'); or (2) the portion of the wireless spectrum being idle and/or available for use (e.g. a '0'), and may thereafter transmit the signal indicative of the wireless communication signal being present or absent in the RF energy to a decoder/precoder (e.g., decoder/precoder 320) of the electronic device described herein.

The comparator 204 may be implemented in hardware, software, firmware, or combinations thereof. For example, the comparator 204 may be implemented using circuitry for comparing values. In some examples, the comparator 204 may be implemented using one or more processing units (e.g. processors) and memory encoded with executable instructions for comparing with a threshold, which, when executed by the one or more processing units, cause comparisons described herein to occur. The processors and/or memory used by the comparator 204 may in some examples be wholly or partially shared with processors and/or memory used to implement statistic calculator 202.

The communication detector 200 may be utilized as any of the communication detectors herein. For example, the communication detector 118 or communication detector 122 may be implemented as the communication detector 200. As another example, the communication detector 320 may be implemented as the communication detector 200.

Figure 3:
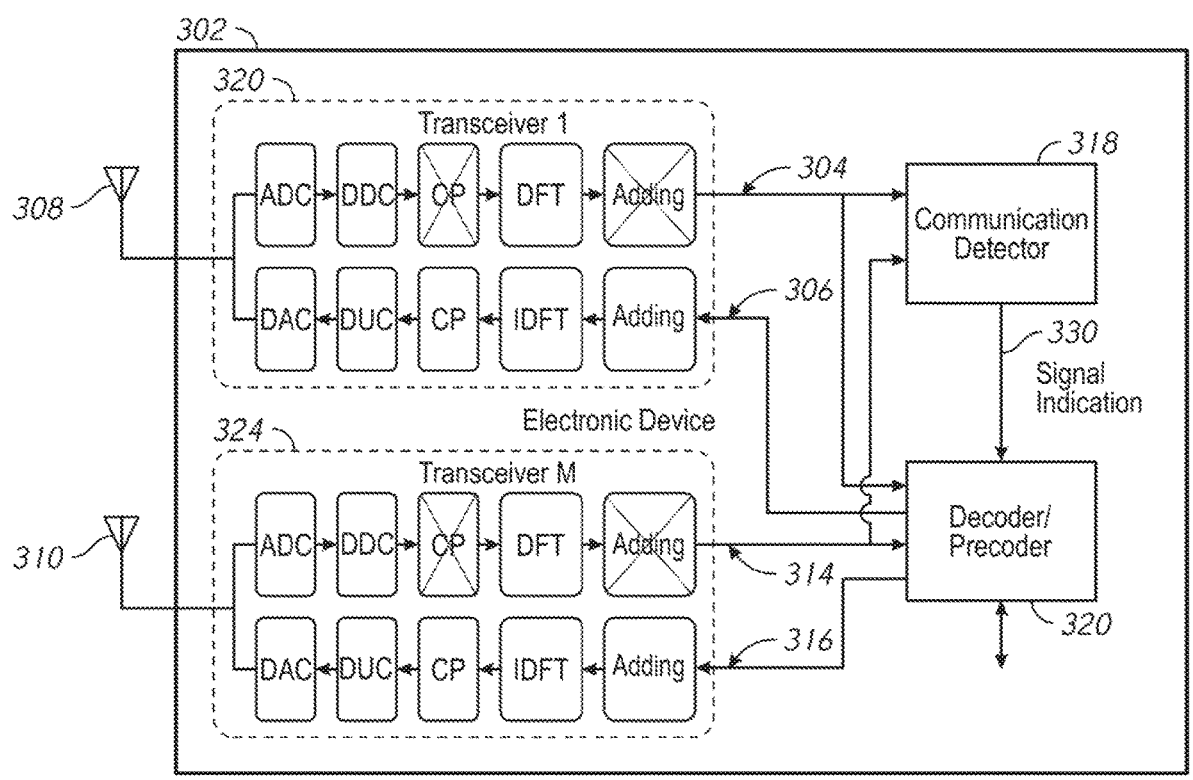
FIG. 3 is a schematic illustration of an electronic device arranged in accordance with examples described herein.

FIG. 3 is a schematic illustration of an electronic device 302 arranged in accordance with examples described herein. The transceiver 320 may be coupled to antenna 308 and may have a receive path 304 and transmit path 306. The receive path 304 may include an analog-to-digital converter ("ADC") coupled to the antenna 308, followed by a digital down-converter ("DDC"), a cyclic prefix remover, a transform (e.g. a discrete Fourier transform, or "DFT"), and an adding removal component. The transmit path 306 may include an adding component, an inverse transform (e.g. an inverse Fourier transform), a digital up-converter ("DUC"), and a digital-to-analog converter coupled to the antenna 308. In the example, the adding component may add an additional processing field to data in the transmit path 306, such as a guard interval period, a post-processing field, a sampling field, or a filtering field. The transceiver 320 may be used to implement and/or be implemented by example transceivers described herein, such as the transceivers 120, 124, 128 and/or the transceivers 126, 130, 132 of FIG. 1. Transceiver 324 may be coupled to antenna 310 and may have a receive path 314 and transmit path 316. In some examples, additional, fewer, and/or different components may be included. Generally one transceiver may be provided for each antenna used in an electronic device. Any M number of transceivers may be included in the electronic device 302, with the transceiver 324 being indicated as the Mth transceiver. In such cases, additional receive and transmit paths may be provided to the communication detector 318 and decoder/precoder 320.

A communication detector 318 may receive symbols indicative of RF energy from the transceivers 320, 324 via the respective receive paths 304, 314. Components of the receive path 304 and/or transmit path 306 may be implemented using circuitry (e.g. analog circuitry) and/or digital baseband circuitry in some examples. The communication detector 318 may provide a signal indication 330 to decoder/precoder 320. The signal indication 330 may be a signal that indicates the presence or absence of a wireless communications signal including encoded data.

During operation, the transceiver 320 may be provided an indication that a portion of the wireless spectrum contains a wireless communication signal, e.g. from the communication detector 318. On receipt of an indication that a portion of the wireless spectrum contains a wireless communication signal, the receive path 304 may operate to receive and/or decode the wireless communication signal. In some examples, a decoder and/or precoder (e.g., a decoder/precoder) may be coupled to the respective receive paths 304, 314 and/or transmit paths 306, 316, respectively.

The digital down conversion operation in receive paths 304, 314 may down convert the frequency domain symbols at a certain frequency band to a baseband processing range. In examples where 5G signals may be received by the transceiver 320, the time-domain 5G symbols may be mixed with a local oscillator frequency to generate 5G symbols at a baseband frequency range. Accordingly, the RF energy that may include time-domain 5G symbols may be digitally down-converted to baseband. The adding removal component in the receive paths 304, 314 may remove an added processing field from the baseband data, such as a guard interval, from the frequency-domain 5G symbols. A DFT operation in the receive paths 304, 314 may be implemented as an FFT operation that transforms the time-domain 5G symbols into frequency-domain 5G symbols. For example, taking an example of an OFDM wireless protocol scheme, the FFT can be applied as N-point FFT $$X_n = \sum_{k=1}^{N} x_k e^{-i2\pi kn/N} \qquad (12)$$

where $X_n$ is the modulated symbol sent in the nth OFDM sub-carrier. Accordingly, the output of the FFT operation may form frequency-domain OFDM symbols. In some examples, the FFT may be replaced by poly-phase filtering banks to output symbols for the synchronization operation.

The decoder/precoder may include various operations to process the receive paths 304, 314. Generally, the decoder/precoder may process the receive paths 304, 314 according to a decoding matrix that decodes the multiple symbols indicative of RF energy from each of the antennas 308, 310. The decoder/precoder may precode data to be transmitted via the antennas 308, 310 along the transmit paths 306, 316.

The decoder/precoder may also include a channel estimator that compensates the symbols by some factor to minimize the effects of the estimated channel. A demodulation mapping operation may demodulate the data outputted from the channel estimation operation. For example, a quadrature amplitude modulation (QAM) demodulator can map the data by changing (e.g., modulating) the amplitude of the related carriers. Any modulation mapping described herein can have a corresponding demodulation mapping as performed by demodulation mapping operation. In some examples, the demodulation mapping operation may detect the phase of the carrier signal to facilitate the demodulation of the 5G symbols. The demodulation mapping operation may generate bit data from the 5G symbols to be further processed by a deinterleaver operation. A deinterleaver operation may deinterleave the data bits, arranged as parity blocks from demodulation mapping into a bit stream for a decoder operation, for example, the deinterleaver operation may perform an inverse operation to convolutional byte interleaving. The deinterleaver operation may also use the channel estimation to compensate for channel effects to the parity blocks. A decoder operation may decode the data outputted from the scrambler to code the data. For example, a Reed-Solomon (RS) decoder, turbo decoder, low-density parity-check (LDPC) decoder, or a polar decoder may be used as a decoder to generate a decoded bit stream for a descrambler operation. Such a decoder may implement a parallel concatenated decoding scheme. While described in the context of a RS decoding and other such decoders, various decoder operations are possible.

As described herein, the operations of the electronic device 302 can include a variety of RF processing operations performed with analog circuits and/or digital implementations of analog circuits. Such operations can be implemented in a conventional wireless transceiver, with each operation implemented by specifically-designed hardware for that respective operation. For example, a DSP processing unit may be specifically-designed to implement the FFT operation. As can be appreciated, additional operations of a wireless transceiver may be included in a conventional wireless transceiver, and some operations described herein may not be implemented in a conventional wireless receiver. Accordingly, while specific components are not depicted in FIG. 3 that represent a corresponding specifically-designed hardware component of a transceiver 320, 324, it can be appreciated that the wireless receiver 110 may include such components and process the symbols indicative of RF energy as described herein.

Figure 4:
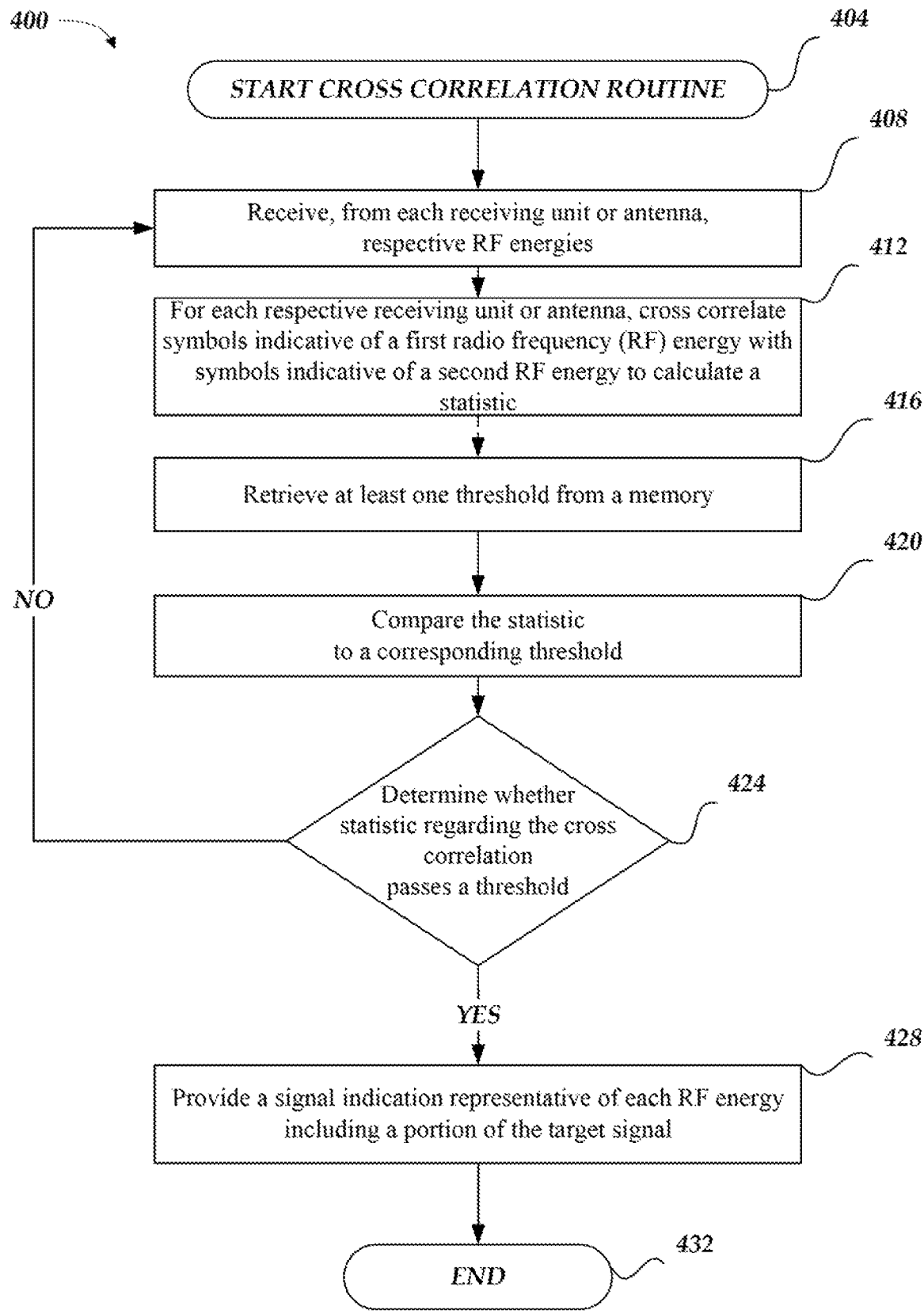
FIG. 4 is a schematic illustration of a method arranged in accordance with examples described herein

FIG. 4 is a flowchart of a method 400 in accordance with examples described herein. Example method 400 may be implemented using, for example, system 100 in FIG. 1, system 300 in FIG. 3, or any system or combination of the systems depicted in FIGS. 1-3 described herein. The operations described in blocks 404-432 may also be stored as computer-executable instructions in a computer-readable medium such as a computer readable medium 115, 117 and/or computer readable medium 315, 317.

Example method 400 may begin with a block 404 that starts execution of the a cross correlation routine. The method may include a block 408 that recites "receive, from each receiving unit or antenna, respective RF energies." As described herein, antennas 308, 310 may receive respective RF energies (e.g., RF signals at respective portions of the wireless spectrum. In the example, the RF signals may be processed by the respective transceivers 320, 324. Block 408 may be followed by block 412 that recites "for each respective receiving unit or antenna, cross correlate symbols indicative of a first RF energy with symbols indicative of a second RF energy to calculate a statistic." As described herein, a statistic calculator may be configured to calculate a statistic including a cross-correlation of symbols indicative of radio frequency (RF) energy received from at least two antennas. For example, a wireless communication signal may include an OFDM symbol and a corresponding cyclic prefix that is received during a guard interval of the OFDM symbol. The cross correlation may include a cross correlation factor based on RF energy extracted from a guard interval time period. In an example including an additional statistic calculator, if the additional statistic calculator corresponds to a signal power autocorrelation statistic calculator, each respective receiving unit may autocorrelate a respective power of the respective RF energies to calculate a statistic to perform a "soft detection." Block 412 may be followed by block 416 that recites "retrieve at least one threshold from a memory." For example, the comparator 204 may be used to compare a statistic calculated by the statistic calculator 202. In an example, the comparator 204 may request the threshold from a memory database that is part of an implementing computing device, from a memory database part of an external computing device, or from a memory database implemented in a cloud-computing device. In turn, the memory database may send the threshold as requested by the comparator 204.

Block 416 may be followed by block 420 that recites "compare the statistic to a corresponding threshold." In the example, the statistic may be compared to a threshold, indicating that symbols indicative of the first RF signal and the symbols indicative of the second RF signal correspond to encoded data. The encoded data may be encoded according to a modulation scheme associated with a 5G protocol. In the example including an additional statistic calculator, the statistic calculated from the autocorrelation may compared to a corresponding threshold that indicates the presence or the absence of the wireless communications signal including encoded data. Block 420 may be followed by a decision block 424 that recites "determine whether the statistic regarding the cross correlation passes a threshold." In the example, the statistic may pass the threshold that is determined to indicate the presence or absence of a wireless communications signal including encoded data. If the statistic is determined to not pass the threshold that indicates the presence of a wireless communication signal, the flow of method 400 proceeds back to block 408 to receive further RF energy at the antennas or receiving units. If, however, the statistic is determined to pass the threshold that indicates the presence of a wireless communication signal, the flow of method 400 proceeds to block 428 that recites "provide a signal indication representative of each RF energy including a portion of the target signal." In the example, the signal indication may indicate to an electronic device that the symbols indicative of RF energy are to be decoded to recover a target signal, which is included in the encoded data. In the example including an additional statistic calculator, the signal indication may be provided to the communication detector that calculates the statistic regarding a cross correlation. Block 428 may be followed by block 432 that ends the example method 400.

In some examples, the block 416 may be an optional block. For example, during a 5G signal transmission, a threshold may be retrieved once (e.g., in a first cycle of a recursive algorithm) and then stored in local memory to be compare the sufficient statistic again at block 420.

The blocks included in the described example method 400 is for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. Other additional blocks may be added such as "powering off a decoder responsive to receiving the signal indicative of the absence of the wireless communication signal," "powering on a decoder responsive to receiving the signal indicative of the presence of the wireless communication signal," and "decoding the symbols indicative of RF energy associated with the first antenna according to a decoding matrix."

From the foregoing it will be appreciated that, although specific embodiments of the invention have been described herein for purposes of illustration, various modifications may be made without deviating from the spirit and scope of the invention.

What is claimed is:

1. An apparatus comprising:
 a plurality of antennas;
 a first transceiver configured to transmit, receive, or both, signals to, from, or both, at least a first antenna of the plurality of antennas;
 a statistic calculator coupled to the first transceiver and configured to calculate a statistic including a cross-correlation of symbols indicative of radio frequency (RF) energy received from at least two of the plurality of antennas including the first antenna in a particular portion of a wireless spectrum via the first transceiver;
 a comparator coupled to the statistic calculator and configured to provide a signal indicative of a presence or absence of a wireless communication signal in the particular portion of the wireless spectrum based, at least in part, on a comparison of the statistic with a threshold; and
 a decoder/precoder coupled to the comparator and configured to receive the signal indicative of the presence or absence of the wireless communication signal, wherein the decoder/precoder is further configured to power on into a power on state of the decoder/precoder responsive to receiving the signal indicative of the presence of the wireless communication signal, wherein the decoder/precoder is further configured to power off into a power off state of the decoder/precoder responsive to receiving the signal indicative of the absence of the wireless communication signal;
 an additional statistic calculator configured to autocorrelate respective powers of the symbols indicative of RF energy received from the at least two of the plurality of antennas to calculate an additional statistic; and
 an additional comparator configured to provide an additional signal indicative of an absence of the wireless communication signal in the particular portion of the wireless spectrum based, at least in part, on a comparison of the additional statistic with an additional threshold, and
 wherein the decoder/precoder is further configured to power off into the power off state of the decoder/precoder responsive to receiving the additional signal indicative of the absence of the wireless communication signal.

2. The apparatus of claim 1, wherein the decoder/precoder is further configured to decode the wireless communication signal in the particular portion of the wireless spectrum in accordance with a decoding matrix responsive to a signal indicative of the presence of the wireless communication signal.

3. The apparatus of claim 1, further comprising:
 a second transceiver configured to transmit, receive, or both, signals to, from, or both, at least a second antenna of the plurality of antennas,
 wherein the symbols indicative of radio frequency (RF) energy received from at least two of the plurality of antennas includes symbols indicative of RF energy received from the second antenna in another particular portion of the wireless spectrum via the second transceiver.

4. The apparatus of claim 3, wherein the symbols indicative of radio frequency (RF) energy received from at least two of the plurality of antennas correspond to a first plurality of symbols received from a first receive path of the first transceiver and a second plurality of symbols received from a second receive path of the second transceiver.

5. The apparatus of claim 3, wherein the symbols indicative of radio frequency (RF) energy received from at least two of the plurality of antennas include symbols from guard interval time periods.

6. The apparatus of claim 4, wherein the symbols from the guard interval time periods corresponds to symbols extracted from an Orthogonal Frequency Domain Modulation (OFDM) guard interval time period.

7. The apparatus of claim 1, wherein the comparator is implemented using one or more processing units and memory encoded with executable instructions for comparing with a threshold, which, when executed by the one or more processing units, cause comparisons of the cross correlation of the symbols to the threshold.

8. An apparatus comprising:
 a plurality of antennas;
 a first transceiver configured to receive a first radio frequency (RF) signal from a first antenna of the plurality of antennas;
 a second transceiver configured to receive a second radio frequency (RF) signal from a second antenna of the plurality of antennas;
 a first communication detector coupled to the first transceiver and the second transceiver, the first communication detector comprising:
  a first statistic calculator configured to cross correlate symbols indicative of the first RF signal and symbols indicative of the second RF signal to calculate a first statistic including a cross-correlation of symbols indicative of the first RF signal and symbols indicative of the second RF signal; and a first comparator coupled to the first statistic calculator and configured to provide a first signal indicative of a presence or absence of encoded data in the first RF signal or the second RF signal based, at least in part, on a comparison of the first statistic with the first threshold;

a second communication detector coupled to the first transceiver and the second transceiver, the second communication detector comprising:

a second statistic calculator configured autocorrelate respective powers of the first and second RF signals to calculate a second statistic; and a second comparator configured to provide a second signal indicative of a presence or absence of encoded data in the first RF signal or second RF signal based, at least in part, on a comparison of the second statistic with a second threshold; and a decoder/precoder coupled to the first comparator and configured to receive the first signal indicative of the presence or absence of the encoded data in the first RF signal or the second RF signal, wherein the decoder/precoder is further configured to power on responsive to receiving the first signal indicative of the presence of the encoded data in the first RF signal or the second RF signal, wherein the decoder/precoder is further coupled to the second comparator and configured to receive the second signal indicative of a presence or absence of encoded data in the first RF signal or second RF signal, and wherein the decoder/precoder is further configured to power off responsive to receiving the second signal indicative of the absence of the encoded data in the first RF signal or the second RF signal.

9. The apparatus of claim 8, wherein the encoded data comprises data transmitted according to a 5G wireless protocol.

10. The apparatus of claim 8, wherein the first statistic comprises a first cross correlation factor including the symbols indicative of the first RF signal and the symbols indicative of the second RF signal and a second cross correlation factor including symbols indicative of a first guard interval time period associated with the first RF signal and symbols indicative of second guard interval time period associated with the second RF signal.

11. The apparatus of claim 8, wherein the first threshold indicates that symbols indicative of the first RF signal and the symbols indicative of the second RF signal correspond to encoded data associated with a 5G wireless protocol.

12. The apparatus of claim 8, where the first signal indicative of the presence or absence of the encoded data in the first RF signal or the second RF signal corresponds to a signal indicative of the first RF signal or second RF signal including a 5G signal.

13. The apparatus of claim 8, wherein the first statistic calculator corresponds to a pilot signal statistic calculator configured to calculate a cross correlation of the symbols indicative of the first RF signal or the symbols indicative of the second RE signal with a pilot signal or a guard interval statistic calculator configured to calculate the symbols indicative of a first guard interval time period associated with the first RF signal and symbols indicative of second guard interval time period associated with the second RE signal, and wherein second statistic calculator corresponds to a signal power statistic calculator configured to calculate an autocorrelation of the first RF signal or the second RE signal.

14. The apparatus of claim 8, wherein the first transceiver comprises:

an analog-to-digital (ADC) converter configured to convert the RE energy to a digital symbols;

a digital down converter (DDC) configured to mix the digital symbols using a carrier signal to generate down-converted symbols; and a fast Fourier transform (FFT) configured to convert the down-converted symbols domain to generate the symbols indicative of RF energy.

15. A method, comprising:

receiving, from each antenna of a plurality of antennas, respective RF energies, each antenna coupled to a respective receiving unit of a plurality of receiving units;

for each respective receiving unit, autocorrelating a respective power of the respective RF energies to calculate a first statistic;

comparing, at a first statistic calculator, the first statistic to a first threshold that indicates a presence or an absence of a wireless communications signal including encoded data;

providing a first signal indication based on a determination that the first statistic passes the first threshold, the first signal indication representative of the presence of the wireless communications signal including the encoded data;

based on obtaining the first signal indication, for each respective receiving unit, cross correlating symbols indicative of RF energy associated with a first antenna with at least other symbols indicative of RF energy associated with at least a second antenna to calculate a second statistic;

comparing, at a second statistic calculator, the second statistic to a second threshold that indicates the presence or the absence of the wireless communications signal including encoded data;

determining that the second statistic does not pass the second threshold;

providing a second signal indication representative of the absence of a wireless communications signal including encoded data; and powering off a decoder responsive to receiving the second signal indicative of the absence of the wireless communication signal.

16. The method of claim 15, further comprising:

powering on the decoder responsive to receiving the first signal indication of the presence of the wireless communication signal.

17. The method of claim 15, further comprising:

decoding the symbols indicative of RF energy associated with the first antenna according to a decoding matrix.

18. The method of claim 15, wherein cross correlating symbols indicative of the respective RF energies comprises utilizing a recursive method to calculate a cross-correlation over the symbols and the at least other symbols, the cross-correlation of the symbols corresponding to the second statistic.

19. The method of claim 18, wherein utilizing the recursive method to calculate the cross-correlation over the symbols comprises:

transposing the at least other symbols indicative of RF energy associated with the second antenna;

multiplying the transposed at least other symbols with the symbols indicative of RF energy associated with the first antenna to generate an intermediate result; and multiplying the intermediate result with a constant associated with a symbol duration of the symbols indicative of RF energy associated with the first antenna.

20. The method of claim 18, wherein utilizing the recursive method to calculate the cross correlation over the symbols comprises:

multiplying transposed at least other symbols of each respective RF energy with the symbols indicative of RF energy associated with the first antenna to generate a plurality of intermediate results and intermediate result; and generating the first statistic based on summations of the intermediate results based on a duration of a time period to receive the respective RF energies and a number of antennas of the plurality of antennas.

* * * * *